May 13, 1969 G. GOOSSENS 3,443,909
ROTARY DRUM REACTOR
Filed Sept. 6, 1966 Sheet _1_ of 2
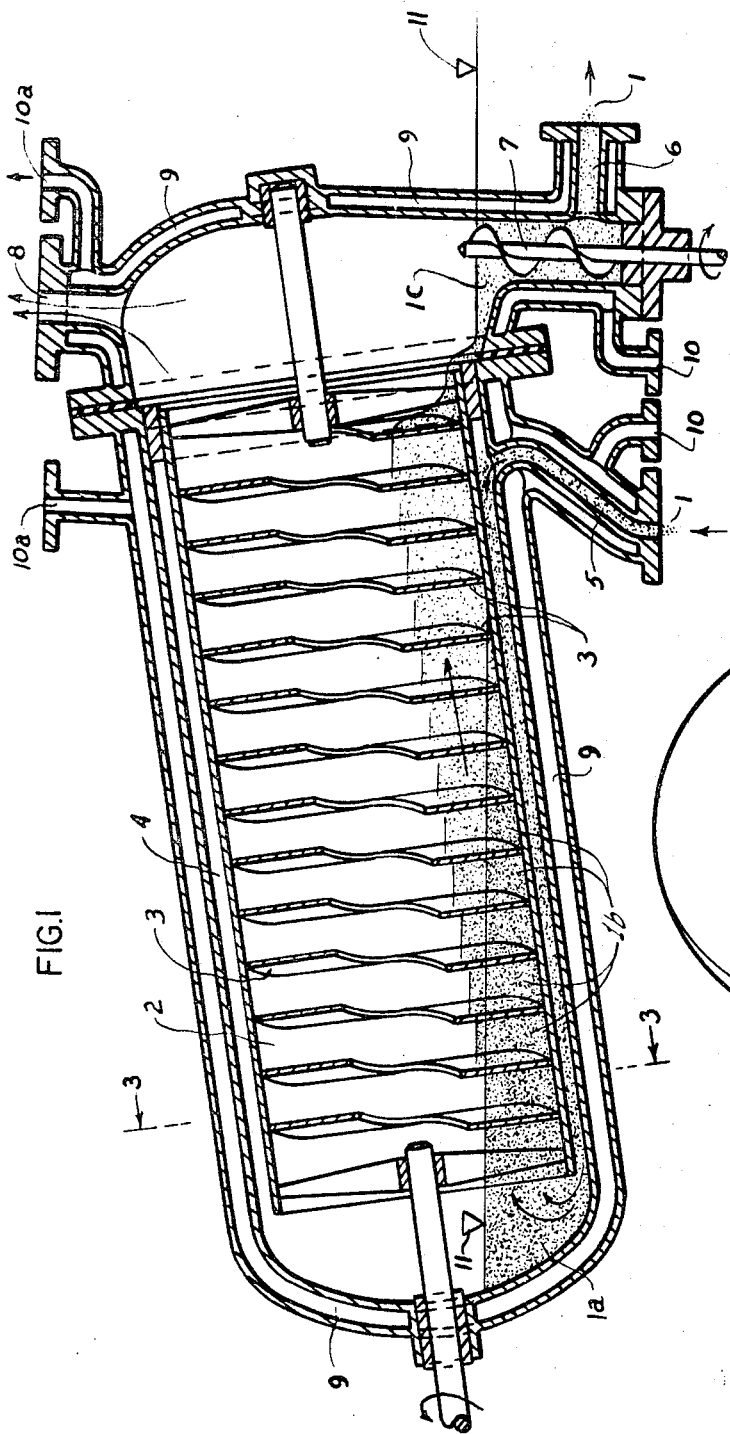
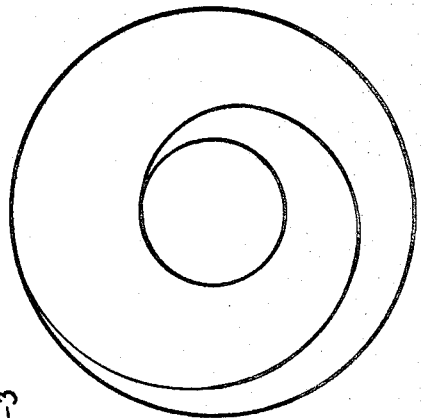
INVENTOR.
GUNTER GOOSSENS
H. Edward Mestern

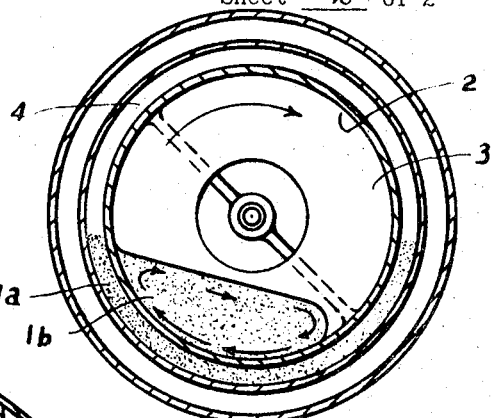
FIG.3
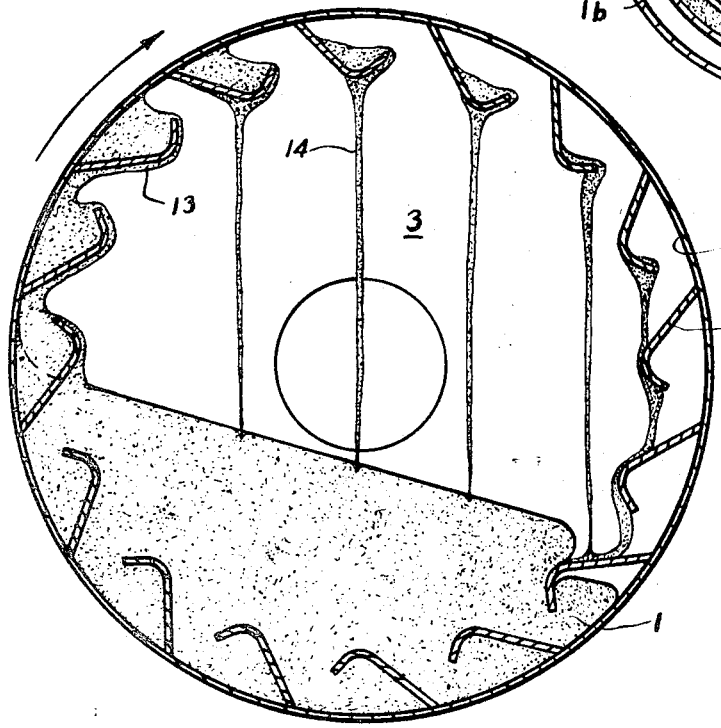
FIG.4
FIG.5
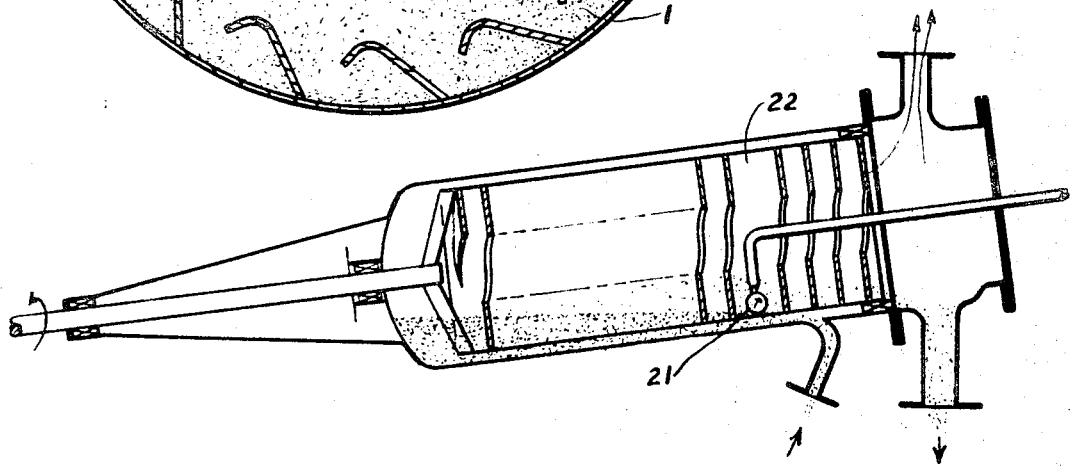
INVENTOR.
GUNTER GOOSSENS
BY
*H. Edward Mester*

United States Patent Office 3,443,909
Patented May 13, 1969

3,443,909
ROTARY DRUM REACTOR
Gunter Goossens, Rial, Switzerland, assignor to Inventa A.G., fur Forschung und Patentverwertung, Zurich, Switzerland
Filed Sept. 6, 1966, Ser. No. 577,320
Claims priority, application Switzerland, Sept. 8, 1965, 12,528/65
Int. Cl. F27b 7/08; B01j; C08g 35/00
U.S. Cl. 23—286      11 Claims The invention relates to a rotary drum reactor for continuous processes to carry out chemical reactions in liquids or liquid mixtures of high viscosities, i.e., up to several thousand poises and whereby the viscosities might greatly increase during the reaction. This occurs, e.g., in the manufacture of high viscosity plastic melts.

It is well known that polycondensation processes, such as the manufacture of linear saturated and unsaturated polyesters, polyamides, polycarbonates, and others, can be carried out batchwise but that this is accompanied by severe disadvantages. One of these drawbacks is the lack of uniformity of the several batches manufactured. In continuous processes correspondingly high demands are made on the uniformity of the reaction conditions in order to obtain uniform products. It is of particular importance to have constant and well-controlled dwelling times in the different process steps. This meets with difficulties in the final step wherein a highly viscous melt is present. Other difficulties reside in the adjustment of this process step to the conditions of the other parts of the device in continuous operation.

A reactor for this phase of the process must comply with the following conditions:

(a) The dwelling time of the reaction medium should be adjustable at will, but the time once chosen must remain absolutely constant;

(b) The spectrum of the dwelling time should be narrow;

(c) The reaction medium content should be variable whereby variable dwelling times at constant throughput or variable throughput at constant dwelling time can be attained;

(d) Heat transfer through the reactor wall should be feasible;

(e) The reaction medium should have a free surface which should be as large as possible;

(f) All portions of the viscous reaction medium should reach the free surface or at least its immediate vicinity for as long a time as possible.

The conditions (a) to (d) above are required to attain good control of the reaction and the uniform conditions named above. The conditions (e) and (f) are needed to facilitate evaporation of lower boiling by-products or solvents.

The construction of hitherto known reactors for the purposes named falls into two groups:

(1) reactors wherein the reaction medium is moved by gravity, e.g., thin layer evaporators;
(2) reactors with mechanical conveyor means for the reaction medium.

The principal drawback of reactors without mechanical conveyor means is the lack of control of the dwelling times. Flow properties change with the viscosity. The speed of flow can be influenced by external means only with difficulty. This drawback is sufficiently grave not to employ this type of reactor in instances when the dwelling time must be maintained exactly. In reactors with mechanical means, the dwelling time can be influenced directly by the speed of the movement of the conveyor.

A design is known, for instance, wherein rotating discs dip into the viscous reaction medium. These discs are provided with blades or the like which are offset in such a manner that they are suited for axial conveyance. However, the dwelling time cannot be regulated with the necessary degree of exactness because no guided or forced conveyance is present.

Improved embodiments of this type have, in lieu of the blades, screws or worms which either are interrupted or else extend the full length. This provides guided transportation and thus exact regulation of the dwelling time.

Also known are embodiments wherein two or more meshing screws are provided which effect more uniform thicknesses of the layers formed by the reaction medium and also better mixing. However, these devices are more complicated.

The principal disadvantage of the reactors described is the precision required in their construction thus high cost of manufacture.

Moreover, the slit between the screws and the reactor wall surrounding them must be very small in order to avoid leakage which would widen the dwelling time spectrum. It is especially difficult to comply with this requirement when the reactors are to operate at relatively high temperatures, e.g., between 200 and 400° C. because distortion of the vessels due to nonuniform heating must be considered in order to avoid under all circumstances a contact of the screws with the reactor wall.

It is the object of the invention to devise a reactor which is devoid of the drawbacks named above and which complies with all requirements listed as (a)–(f) above.

The device according to the invention consists of a drum rotating within the reactor. This drum carries on its inside a tightly welded sheet metal spiral which positively and guidedly carries the reaction mixture without leakage.

The invention now will be further explained with reference to the accompanying drawings. However, it should be understood that these are given merely by way of illustration, and not of limitation, and that changes may be made in the details without departing from the spirit and the scope of the invention as hereinafter claimed.

In the drawings,

FIG. 1 is a schematic section through a reactor according to the invention;

FIG. 2 is a diagrammatical view of the spiral;

FIG. 3 is a sectional view along lines 3—3 of FIG. 1;

FIG. 4 is a sectional view through a different embodiment of a reactor; and

FIG. 5 is a schematic showing an elevation of a reactor with a built-in sampling device.

Referring now to these drawings, the rotary drum 2 is open at both ends and carries on its inside the welded-on sheet metal spiral 3. Drum 2 is fully surrounded by the reactor vessel 4. The maintenance of a very fine slit between the rotating unit and the reactor wall is not required, in contrast to the screw reactors known as state of the art. Therefore, the principal drawback of these devices instantly is eliminated. Since the spiral 3 is integrally connected with the drum 2 throughout its length, leakage cannot occur which is another great advantage over existing screw reactors especially because forced conveyance of the reaction medium simultaneously is effected. Moreover, the reactor can be filled at a high rate, i.e., the space available is used to a large extent.

The viscosity of the reaction medium may increase greatly during its dwelling time in the vessel, for instance by a factor of 10, without incurring difficulties in production.

The reactant 1 is introduced into the reactor vessel 4 through feed pipe 5 and thus enters the space between the wall of reactor 4 and the outer surface of rotary drum 2. It partly flows around the drum and transfers heat between the walls. When this heat is insufficient, drum 2 can be heated by commonly known means, or, if required, can also be cooled.

The reaction medium thence travels into space 1a (seen at left in FIG. 1) and then into the passages formed by the spiral 3. The drum rotates at a slow speed so that the reaction medium always flows off the drum wall and towards its lowest part. Thereby a number of liquid volumes 1b form which are fully separated from each other. These volumes 1b are forcedly driven towards the right as seen in FIG. 1 and from there into space 1c from which they are removed to the outside of the reactor by discharge means 7 by way of outlet pipe 6.

A film of the reaction medium always adheres to the inner and outer wall of drum 2 and to the metal spiral 3 which is exchanged by renewed immersion following one revolution. This is illustrated in FIG. 3, and the arrows therein show that the rotation of the compact medium is very satisfactory since a certain rolling movement of the medium within the drum occurs. As shown in FIG. 2, the pitch of the spiral 3 increases at the drum inlet and decreases at its outlet, whereby the increase and decrease, respectively, is distributed within an angle of 360° in order to avoid deviations in the liquid level in the spaces 1a and 1c due to sudden release of the volumes 1b which would occur if the terminal edges of the spiral were vertical. This facilitates a constant in- and outflow into and from the drum.

In FIG. 4 an embodiment is shown wherein at the inner wall of drum 2 blades 12 are disposed in longitudinal direction. These are interrupted by the passages of spiral 3. When the drum rotates, the blades lift a portion of the reaction medium 1 and drop the same in the form of a film 13 and of fine, free-falling threads 14. This greatly increases the free surface of medium 1 and simultaneously improves its mixing. In lieu of blades, other surface-increasing means can be installed.

The rotary drum reactor according to FIG. 1 is a cascade system consisting of three partitions, 1a, 1b, 1c. In the center partition 1b which is the largest, a pure cork-screw flow prevails therein. It also is feasible to partition 1b into any number of chambers of a cascade. This is effected by interrupting the spiral.

Vapors and gases forming during the reaction are released from reactor 4 by way of pipe 8. The entire reactor vessel is surrounded by a heating or cooling jacket 9. The heating or cooling agent is introduced through inlet pipes 10 and removed through outlets 10a.

The dwelling time of the reaction medium in the reactor is controlled primarily by the number of revolutions per minute of the rotary drum. The dwelling time in partition 1b, by far the largest of the three, depends thereon directly. The dwelling time in paritions 1a and 1c also depends upon the throughput per unit of time. The latter can freely be varied. When the level 11 in partition 1a rises, it also rises in 1b while the time of transportation through the reactor remains constant.

The levels 11 in 1a and 1c also can be controlled by floating bodies whereby the float in 1a can regulate the intake and the one in 1c the output of the discharge means 7. This renders throughput and dwelling time controllable while largely independent of each other so that the operation of the reactor can be adapted to the conditions of the other components of the device.

In FIG. 5 a reactor is shown which carries on the inside a measuring device 21. For the installation of 21 which is immersed in the reaction medium, the spiral is interrupted at 22. This measuring device 21 may be a viscosimeter, a pH meter, a temperature measuring device, or a sampler.

I claim as my invention:

1. A rotary drum reactor suitable for use with highly viscous materials comprising a reaction vessel; a rotatable drum disposed therein being open at both ends and occupying most of the space of said vessel; a spiral rigidly connected to the inside of said drum and extending the full length thereof, said spiral forcedly transporting the reactants through said drum without leakage; means for rotating and controlling the speed of rotation of said drum; inlet means for the reactants on one end of said vessel leading the same between the wall of the vessel and that of said drum to the opposite end thereof; outlet means opposite said inlet means at the same end of the reactor; discharge means for the reacted materials within said outlet means; and a jacket surrounding the outer periphery of said reaction vessel for heating and cooling fluids.

2. The reactor as defined in claim 1, wherein the space between said reaction vessel and said drum is utilized to effect heat transfer through the wall of said drum.

3. The reactor as defined in claim 1, wherein said spiral is interrupted at least once so as to form a plurality of cascade chambers without the reactants being capable of flowing back therein.

4. The reactor as defined in claim 1, wherein said spiral, at the level of inlet and outlet means, has a varied pitch within 360° to maintain constant reactant level.

5. The reactor as defined in claim 1, wherein said drum is provided with surface-enlarging means between the passages of said spiral, said means lifting part of the reactants and dropping them in the form of a film and free-falling threads to effect an enlarged surface and thorough mixing of the reactants.

6. The reactor as defined in claim 5, wherein said surface-enlarging means are a plurality of blades.

7. The reactor as defined in claim 1, wherein a measuring device is provided within said drum, said spiral being interrupted at the location of said device.

8. The reactor as defined in claim 7, wherein said device is a sampling device.

9. The reactor as defined in claim 7, wherein said device is a viscosimeter.

10. The reactor as defined in claim 7, wherein said device is a temperature measuring device.

11. The reactor as defined in claim 7, wherein said device is a pH meter.

References Cited

UNITED STATES PATENTS

| 1,443,529 | 1/1923 | Dworzak | 263—34 |
| 2,894,824 | 7/1959 | Lanning | 260—95 |
| 3,057,702 | 10/1962 | Pierce et al. | 260—95 |
| 3,220,804 | 11/1965 | Bachmann et al. | 23—286 |
| 3,257,173 | 6/1966 | Parnell | 23—285 |
| 3,343,922 | 9/1967 | Zimmer et al. | 23—285 |
| 3,335,111 | 8/1967 | Pray et al. | 260—95 |

MORRIS O. WOLK, *Primary Examiner.*

SIDNEY MARANTZ, *Assistant Examiner.*

U.S. Cl. X.R.

23—252, 269, 270; 260—95; 263—33, 34